(12) United States Patent
Tsao (10) Patent No.: US 7,714,803 B2
(45) Date of Patent: May 11, 2010

(54) DATA WRITING METHODS FOR VOLUMETRIC 3D DISPLAYS

(76) Inventor: Che-Chih Tsao, 16 Walnut St., Suite 43, Arlington, MA (US) 02476

( * ) Notice: Subject to any disclaimer, the term of this patent is extended or adjusted under 35 U.S.C. 154(b) by 958 days.

(21) Appl. No.: 11/183,358

(22) Filed: Jul. 18, 2005

(65) Prior Publication Data

US 2006/0012598 A1    Jan. 19, 2006

Related U.S. Application Data

(60) Provisional application No. 60/589,108, filed on Jul. 19, 2004, provisional application No. 60/581,422, filed on Jun. 21, 2004, provisional application No. 60/589,626, filed on Jul. 21, 2004, provisional application No. 60/591,128, filed on Jul. 26, 2004.

(51) Int. Cl.
*G09G 5/00* (2006.01)
(52) U.S. Cl. .................. 345/6; 30/84; 30/419
(58) Field of Classification Search .......... 345/6, 345/84, 419, 32, 30
See application file for complete search history.

(56) References Cited

U.S. PATENT DOCUMENTS 5,954,414 A * 9/1999 Tsao .............................. 353/7

6,040,880 A * 3/2000 Tsuboi et al. ................. 349/5
6,302,542 B1 * 10/2001 Tsao .............................. 353/7
6,961,045 B2 * 11/2005 Tsao .......................... 345/103
2002/0070943 A1 * 6/2002 Hall .......................... 345/572

OTHER PUBLICATIONS

"Discovery 1100 Controller Board & Starter Kit—Technical Reference Manual", Productivity Systems Inc., Richardson, Texas, 2004.

* cited by examiner

*Primary Examiner*—Henry N Tran
*Assistant Examiner*—Viet Pham (57) ABSTRACT

This invention describes procedures for writing data to a spatial light modulator (SLM) to achieve the purpose of "sub-frame method", i.e. increasing effective frame rate of the SLM, without the need of additional color switching means or modulation at illumination source. The purpose is to improve the resolution of V3D displays based on projectors. The method divides the pixels of the SLM into a number of groups and defines each group as a sub-panel. Frames of image data are then written in sequence to each of the sub-panels in a fixed order. An image frame written to a sub-panel is called a "sub-frame" when displayed on the sub-panel. The method then displays one sub-frame on one sub-panel at a time, with the rest sub-panels displaying blank (black). If the SLM has no memory buffer and image is displayed when it is written, then all data on the SLM must be erased after a sub-panel is being displayed and before the next sub-panel is written. If the SLM has a memory buffer and to update the SLM with the written data requires a separate command, then one can erase the data of previous sub-panel after the next sub-panel is written and is ready to display.

7 Claims, 7 Drawing Sheets

| Optical (image displayed) | fs #0-1 | fs #0-2 | fs #0-3 | fs #1-1 | fs #1-2 | fs #1-3 |
|---|---|---|---|---|---|---|
| SLM 1 -R | sub-panel 1 f #0 | sub-panel 2 f #0 | sub-panel 3 f #0 | sub-panel 1 f #1 | sub-panel 2 f #1 | sub-panel 3 f #1 |
| SLM 2 -G | sub-panel 1 f #0 | sub-panel 2 f #0 | sub-panel 3 f #0 | sub-panel 1 f #1 | sub-panel 2 f #1 | sub-panel 3 f #1 |
| SLM 3 -B | sub-panel 1 f #0 | sub-panel 2 f #0 | sub-panel 3 f #0 | sub-panel 1 f #1 | sub-panel 2 f #1 | sub-panel 3 f #1 |

DATA WRITING METHODS FOR VOLUMETRIC 3D DISPLAYS

CROSS-REFERENCE TO RELATED APPLICATIONS AND OTHER DOCUMENTS

This application claims the benefit of prior U.S. provisional application No. 60/589,108, filed Jul. 19, 2004, the contents of which are incorporated herein by reference.

This invention relates to Tsao U.S. patent application Ser. No. 09/882,826, filed Jun. 16, 2001, which has been allowed. This invention also relates to the following co-pending U.S. provisional application by Tsao: No. 60/581,422 filed Jun. 21, 2004, No. 60/589,626 filed Jul. 21, 2004, and No. 60/591,128 filed Jul. 26, 2004.

This invention also relates to the following US patents: Tsao et al., U.S. Pat. No. 5,754,147; Tsao, U.S. Pat. No. 5,954,414; Tsao, U.S. Pat. No. 6,302,542 B1; and Tsao, U.S. Pat. No. 6,765,566 B1.

The above documents are therefore incorporated herein for this invention by reference.

STATEMENT REGARDING FEDERALLY SPONSORED R&D

Not Applicable

REFERENCE TO COMPACT DISK APPENDIX

Not Applicable

BACKGROUND OF THE INVENTION

This invention relates in general to the field of three-dimensional (3D) volumetric displays. More specifically, it relates to data writing schemes to increase resolution of volumetric 3D displays using projectors as image sources.

Figure 7:
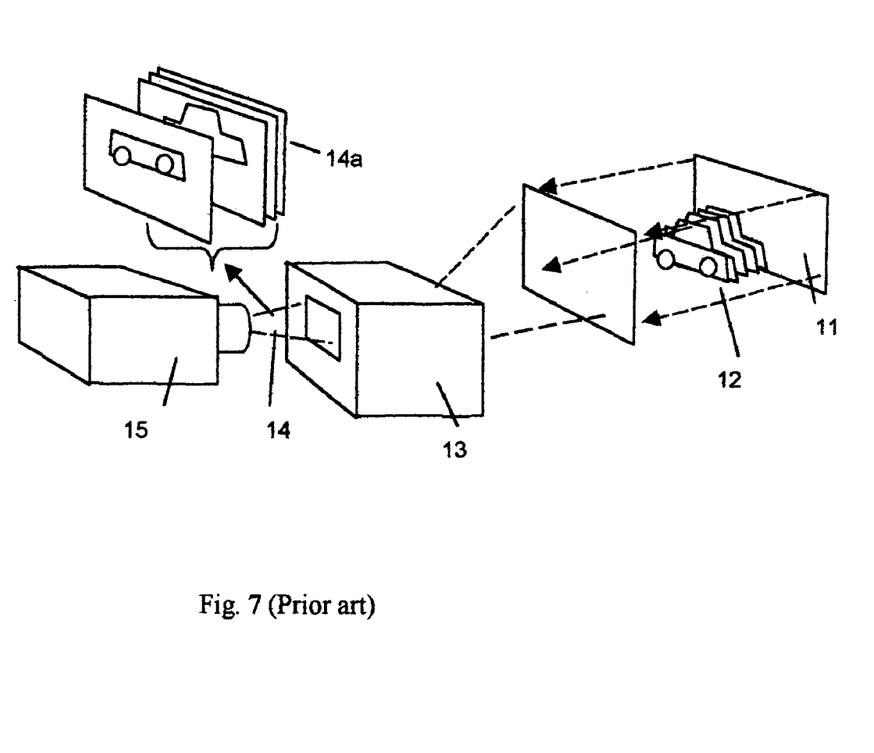
FIG. 7 illustrates a typical type of V3D display applying the Moving Screen Projection technique in the prior art.

Tsao U.S. Pat. No. 6,302,542 B1 describes a typical type of V3D display applying the Moving Screen Projection technique. As shown in FIG. 7, the system comprises three major portions:

(1) The moving screen: The periodically moving screen 11 displays the projected images and forms the display space 12.

(2) The image delivery mechanism: The image delivery mechanism 13 relays the projection beam 14, which contains a set of 2D image frames 14a, projected from the image projector onto the moving screen for displaying. The mechanism keeps the size and focus of the projected image invariant as the screen moves, and also keeps the orientation of the projected image frame synchronous to the moving screen. (Because direct whole-frame projection from the projector onto the screen is not possible due to the constant motion of the screen.)

(3) The image projector: The image projector 15 generates and projects the set of 2D image frames 14a, through the image delivery mechanism 13, onto the moving screen 11. The image projector generally consists of an image generating panel, a projection lens, and a light source.

By sweeping the screen across the space periodically and rapidly, and sequentially project onto the screen a series of 2D image frames, e.g. the profiles of an auto-body 14a in FIG. 7, the set of 2D image frames can thereby be distributed and displayed over the display space, with each frame located at a specific position in the space. This set of 2D image frames, when viewed from outside the display space, forms a 3D volumetric image, because of the after-image effect (persistence of vision) of human eyes. The image actually occupies space and can be viewed from different angles by many viewers simultaneously without the need of any glasses.

The screen motion can be rotating, reciprocating, or rotary-reciprocating. Correspondingly, the image delivery system can be a set of reflectors with rotating motion, reciprocating motion or rotary-reciprocating motion. Details and variations of the system are described in related patents Tsao et al., U.S. Pat. No. 5,754,147; Tsao, U.S. Pat. No. 5,954,414; and Tsao, U.S. Pat. No. 6,765,566 B1, which are incorporated herein by reference.

In the above example of V3D display, the preferred image source for the projector is a spatial light modulator (SLM) such as DMD (Digital Micro-mirror Device) or FLCD (Ferroelectric Liquid Crystal Display). These are devices of black and white pixels. Using a single DMD or FLCD with a white or monochrome light results in a monochrome volumetric 3D display. To create colors, one can use three DMDs or FLCDs, each illuminated by light of a different primary color. Alternatively, Tsao U.S. patent application Ser. No. 09/882,826 describes a method of using a single panel to generate colors. The single panel is divided into three sub-panels and each sub-panel is illuminated by light of a different primary color. The images of the three sub-panels are then recombined into one at projection. (See FIG. 10a of the application as example)

In general, the resolution of a SLM-based V3D display in the direction of screen motion is limited by the frame rate of the SLM. However, a "Sub-frame Method" can be applied to redistribute the pixels on the SLM in the direction of screen motion and to increase the effective frame rate of the SLM. Tsao U.S. Pat. No. 6,765,566 B1 describes the method. The method first separates each color image frame from a projector into three sub-frames in the time domain, each sub-frame of a different primary color, by modulating and switching the color of the illumination source with a color switching means or switching after the projection lens. In the case when the sub-frames are from an SLM defined with sub-panels, this separation is achieved by modulating the illumination to each sub-panel such that only one sub-panel is illuminated at any time and for only a short period of time, as described in Tsao U.S. patent application Ser. No. 09/882,826. Then projected images from three such projectors are superimposed in a manner such that at any moment a superimposed image frames contains 3 sub-frames, each from a different projector and of a different primary color. This allows the display of color V3D images of resolution higher than allowed if only full frames, instead of sub-frames, are used. It will be nice if the need for illumination modulation can be removed in the method of Sub-frame Method.

BRIEF SUMMARY OF THE INVENTION

This invention describes procedures for writing data to a SLM to achieve the purpose of "sub-frame method", i.e. increasing effective frame rate of the SLM, without the need of additional color switching means or modulation at illumination source. The purpose is to improve the resolution of V3D displays based on projectors.

This invention requires a SLM system with operational features satisfying the following minimum requirements:

(1) Data can be written to the SLM in one small "unit" at a time. For example, a unit can be a row or a word. A "word" is defined as a part of a row, such as 32 or 64 pixels, for examples. A unit can also consist of a few rows or a block covering part of the active area of the SLM. In general, a unit is smaller than a sub-panel.

(2) During data writing, the location of the unit currently under writing can always be known.

(3) To begin writing data, a beginning location and a beginning direction can be set. The beginning location points to the first section to be written. The beginning direction indicates to which direction on the SLM the writing will go, for examples, to the next row below or above or to the next word left or right.

(4) Data writing can be stopped with the flag pointing to current location (of unit) left at the last position. And writing can be restarted and continued from the last position. This requirement is not needed if the beginning location of writing (in requirement (3)) can be randomly selected.

(5) Data already on the SLM, all or partial, can be erased in a quick operation. The "quick operation" means faster than writing "0" bits to the existing data locations. If the beginning location of writing (in requirement (3)) can be randomly selected, then this requirement is not necessary, although preferred.

The method of displaying a volumetric 3D image by projecting sub-frames from sub-panels on a SLM without illumination modulation include the following major steps:

(1) Provide a set of image frame data to be displayed to form the volumetric 3D image.

(2) Divide the pixels of the SLM into a number of groups and define each group as a sub-panel.

(3) Project the images of the sub-panels and recombine and superimpose them into one picture frame.

(4) Write data of each image frame to be displayed in sequence to each of the sub-panels in a fixed order. An image frame written to a sub-panel is called a "sub-frame" when displayed on the sub-panel.

(5) Display one sub-frame on one sub-panel at a time, with the rest of the sub-panels displaying blank (black). If the SLM has no memory buffer and image is displayed when it is written, then all data on the SLM must be erased after a sub-panel is being displayed and before the next sub-panel is written. If the SLM has a memory buffer (that is, a frame buffer) and to update the SLM with the written data requires a separate command, then one can erase the data of previous sub-panel after the next sub-panel is written and is ready to display.

(6) Project the sub-frames in the sequence as they are displayed and distribute them to different, predetermined locations in actual space using the volumetric 3D display.

If the sub-panels of a SLM are illuminated by light of the same color, then the resulted sub-frames are all monochromatic. To display color volumetric 3D images, three SLMs or three projectors of this type are used. Each SLM is illuminated with a different primary color. The sub-frames projected from the three SLMs are superimposed into a set of superimposed sub-frames. Each superimposed sub-frame is composed of three sub-frames, each from a different SLM illuminated by a different primary color.

If each sub-panel of on a same SLM is illuminated by light of a different primary color respectively, then the resulted sub-frames are projected in a sequence of repeating three colors, such as R G B R G B . . . . To display color volumetric 3D images, three SLMs or three projectors of this type are used. The sub-frames projected from the three SLMs are superimposed into a set of superimposed sub-frames. However, the projection from each SLM is timed with a difference with respect to other SLMs such that each superimposed sub-frame is composed of three sub-frames, each of a different primary color and from a different SLM.

DETAILED DESCRIPTION OF THE INVENTION

Figure 1A:
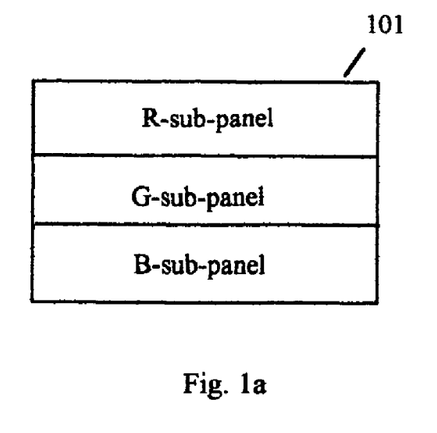
FIG. 1a-c illustrates an example definition of sub-panels on a SLM by this invention.
Figure 1B:
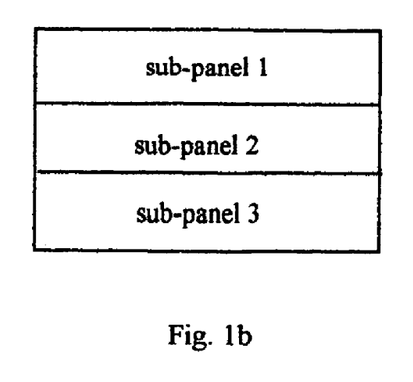

Taking the example of defining three sub-panels on one single display panel (i.e. one SLM) 101, FIG. 1a illustrates the case when each of the sub-panels is defined in a separate and isolated region on the display panel and is illuminated by light of a different primary color. To generalize, the sub-panels can be identified by numbers, in case they are not to be illuminated by different primary colors, as shown in FIG. 1b. The key steps to obtain higher frame rate (or sub-frame rate) for Sub-frame Method include:

(1) Write sub-panel 1, leaving the rest sub-panels blank (or black, optically).

(2) Display and only sub-panel 1 shows.

(3) Quickly erase sub-panel 1 (to blank). Write sub-panel 2, leaving the rest sub-panels blank.

(4) Display and only sub-panel 2 shows.

(5) Quickly erase sub-panel 2 (to blank). Write sub-panel 3, leaving the rest sub-panels blank.

(6) Display and only sub-panel 3 shows.

(7) Quickly erase sub-panel 3. Repeat.

In this way, the sub-panels that we do not want to show appear black and only the written one shows. Therefore, no additional color switching or filtering optics is needed to filter out the sub-panel image that we want. For added clarity, it should be noted that, in the above description and through out this patent application, the terms "displaying of a sub-panel" or "a sub-panel displays . . . " generally mean only the display of the image on a sub-panel of an SLM. These terms do not mean the display of the image controlled by projection or by illumination, because there is no illumination modulation or color filter modulation here. In order to achieve a frame rate higher than the rate of writing and displaying full-frames, the erasing operation in steps (3), (5) and (7) must be fast. The above procedure applies whether the SLM has a frame buffer or not. If the SLM has no memory buffer then image is displayed when it is written. If the SLM has a memory buffer and to update the SLM with the written data requires a separate command, then the erase operation in steps (3), (5) and (7) can also be performed after the next panel is written.

We use a commercial SLM system, the DLP Discovery 1100 DMD system of Texas Instruments, as an example to illustrate this procedure. This SLM system has the following features:

(1) Data can be written to the SLM in one small "unit" at a time. One unit is a row.

(2) During data writing, the location of the unit currently under writing can always be known.

(3) To begin writing data, one can select to start from top row or from bottom row. A writing direction, up or down the SLM, can also be set.

(4) Data writing can be paused with the flag pointing to current location (of unit) left at the last position and can be resumed from the last location.

(5) Data already on the SLM, all or partial, can be erased in a quick operation.

The operation manual of the system is incorporated herein by reference and a pertinent part of the manual of the system is provided for reference.

Figure 1C:
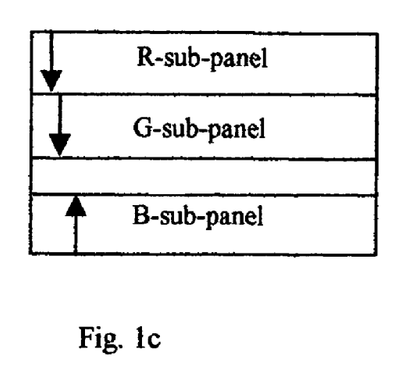
Figure 2:
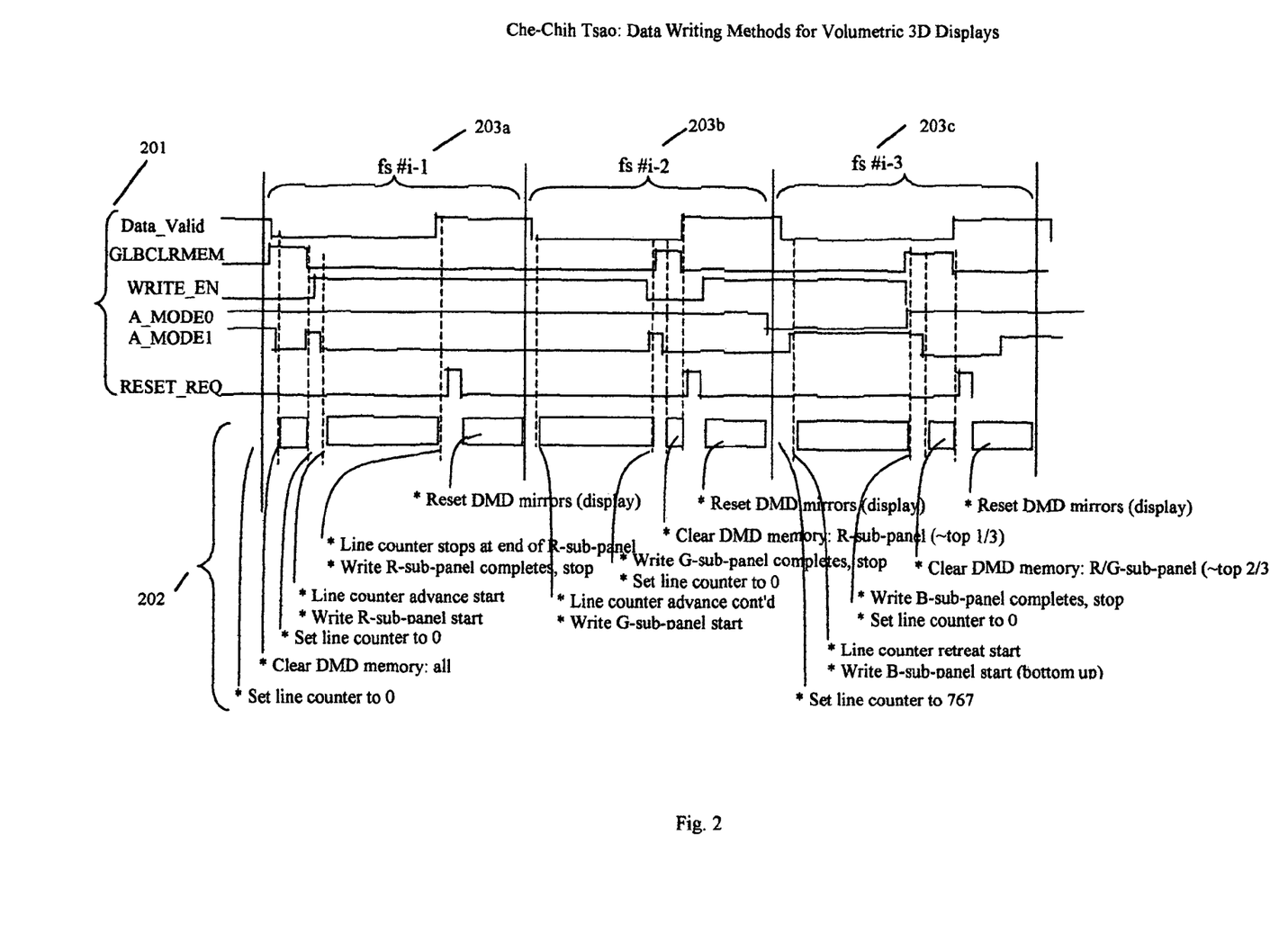
FIG. 2 illustrates the procedure of this invention by an example: the detailed control waves using a Discovery 1100 DMD system.

FIG. 2 shows the detailed waveforms of controls (commands, 201) and the steps of operations 202 within one full-frame duration (i.e. three sub-frame duration, 203a, 203b, 203c). Take note that due to the control functions of Discovery 1100, detailed operation sequence is slightly different from the steps described previously. However, the general approach is the same. For example, in sub-frame index fs #i–2, we write G-sub-panel first and then erase R-sub-panel. This is because Discovery 1100 does not allow line address jumping, except to the top line or bottom line. G-sub-panel is written directly after R-sub-panel is done so that line address continues. For the same reason, B-sub-panel is written from bottom up, even if the sub-panel is defined less than ⅓ of the full frame. FIG. 1c illustrates the idea Take note that the DMD system has a frame buffer memory. Data is written to the memory. A "reset" command displays the data optically.

Figure 3:
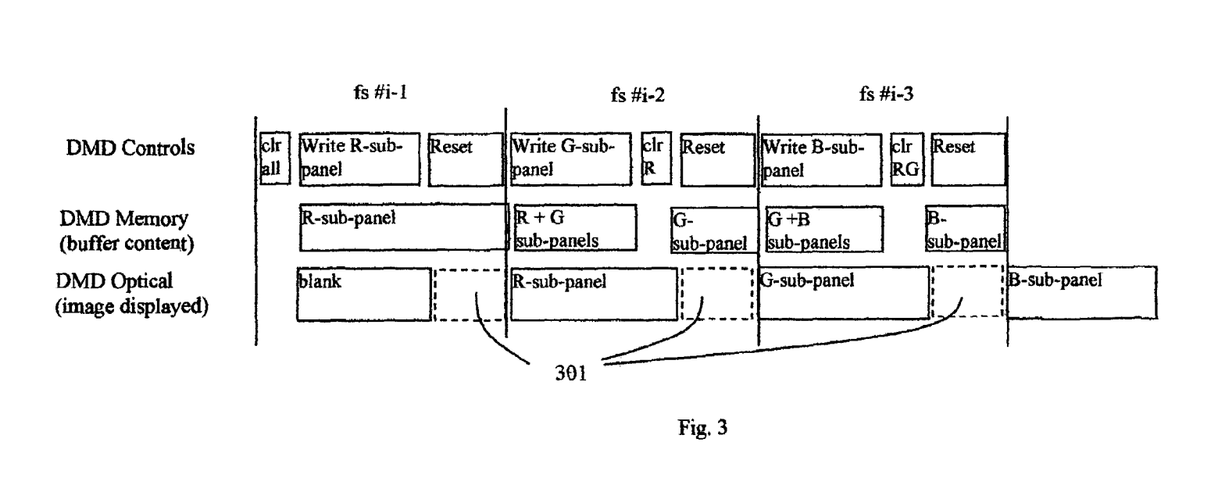
FIG. 3 illustrates the simplified procedure of FIG. 2.

FIG. 3 is basically a simplified representation of FIG. 2. It shows the Status of DMD controls, contents of DMD frame buffer memory and the DMD optical output at different timing. Wherein the "clr" block corresponds to the "clear memory" command; the "Reset" block corresponds to the display command; and the symbol "fs #i–1" represents "sub-frame 1 of frame #i". FIG. 3 shows the data writing sequence, as described previously, of writing data of each sub-frame to be displayed in sequence (e.g. writing sub-frames fs #i–1, fs #i–2, fs #i–3 . . . in sequence) to each of the sub-panels in a fixed order (e.g. by the fixed order of writing fs #i–1 to R-sub-panel, writing fs #i–2 to G-sub-panel and then writing fs #i–3 to B-sub-panel). FIG. 3 also shows that previously written data is erased (by "clr" (clear memory control) before the next sub-panel is to be displayed (by "Reset" control). The optical output lags the frame buffer memory by one sub-frame. There is a transition period between two sub-frames, 301, when the new sub-frame replaces the old sub-frame during the "reset" period, which is short compared to the writing time. Therefore, one can see that at any time there is generally only one sub-panel that carries non-blank images. Each sub-frame has a period slightly longer than ⅓× period of displaying a full frame. The sub-frames are therefore separated without the need of illumination modulation. It should also be reminded that although R, G, and B are used to name the sub-panels in FIG. 2 and FIG. 3, naming by 1, 2 and 3 is equivalent. The separation of sub-frames by data writing procedure is not affected by the colors of illumination received by each sub-panel.

If the three sub-panels are illuminated by different primary colors, then a set of dichroic reflectors can be used to independently adjust the projection beams from the sub-panels and merge the images of the three sub-panels into one picture frame. One example setup is FIG. 10a of Tsao U.S. patent application Ser. No. 09/882,826.

If the three sub-panels are illuminated by the same color, then the projection beams from the sub-panels have to be spatially de-coupled so that they can be independently deflected by different reflectors to merge into one picture frame. One example setup is FIG. 8c of Tsao U.S. patent application Ser. No. 09/882,826.

Figure 4:
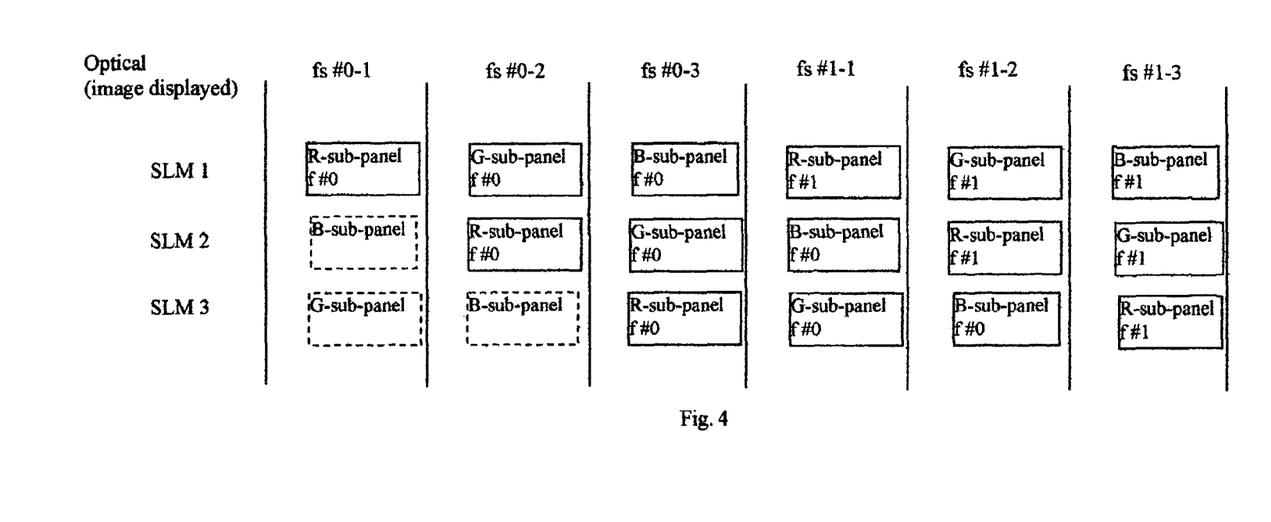
FIG. 4 illustrates method of superimposing sub-frames from three different SLMs to generate color sub-frames, each SLM having three sub-panels, each illuminated with a different primary color.

To combine sub-frames from three SLMs, each having three sub-panels, to form superimposed color sub-frames, there are two preferred methods. In the first method, on each SLM, lights of different primary colors illuminate the three sub-panels respectively. FIG. 4 illustrates how the sub-frames from different SLMs should be combined into superimposed sub-frames, assuming the sub-panel arrangement for each of the three SLMs is the same as FIG. 1a, i.e. R at top and B at bottom. It is most convenient to start the operation cycle of each panel from R-sub-panel, because Discovery 1100 DMD does not allow jumping to the central of the display panel and begin from G-sub-panel. In this case, the starting time of each panel should be offset by one sub-frame duration, as shown in FIG. 4, in order to line up the R-G-B sub-frames for combination. The contents of the sub-frames should therefore be programmed accordingly.

Figure 5:
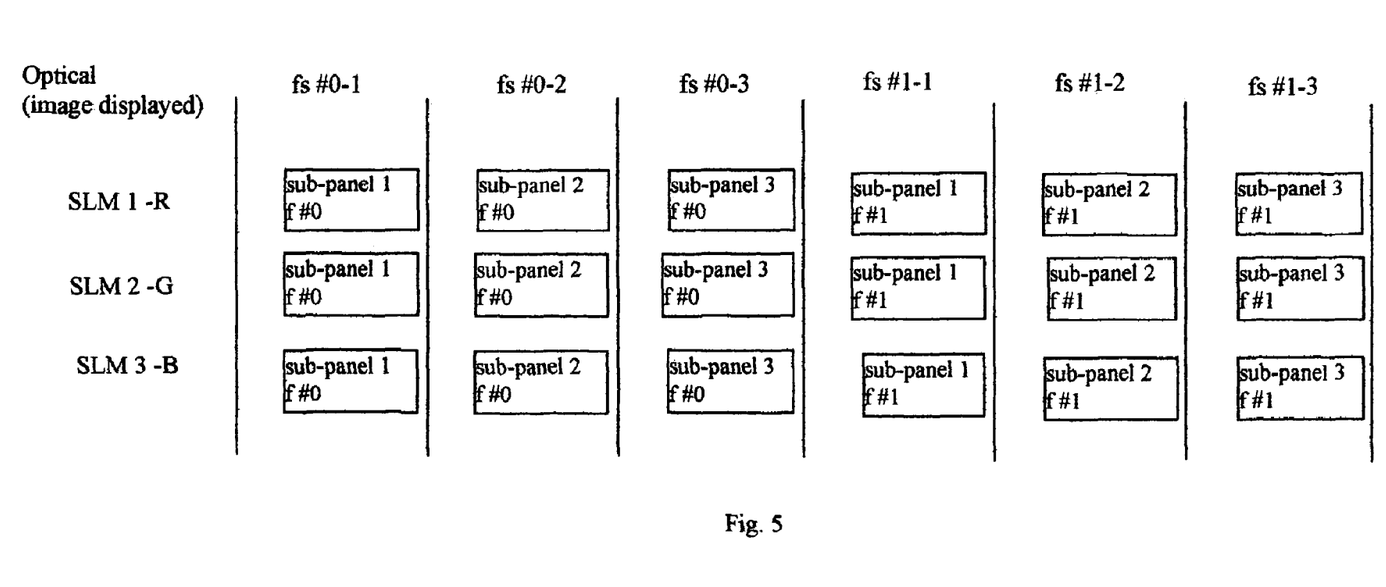
FIG. 5 illustrates method of superimposing sub-frames from three different SLMs to generate color sub-frames, each SLM being illuminated with a different primary color.

In the second method, each of the three SLMs is illuminated with a different primary color and every sub-panel on the same SLM is of a same primary color. In this case, FIG. 5 illustrates how the sub-frames from different SLMs should be combined into superimposed sub-frames. In general, the three SLMs can synchronize their projections and the 1-sub-frame offset of FIG. 4 is not needed here. The contents of the sub-frames should therefore be programmed accordingly.

In the above two methods, the three SLMs can be implemented in one projector or can be a collection of three single-SLM projectors.

Figure 6:
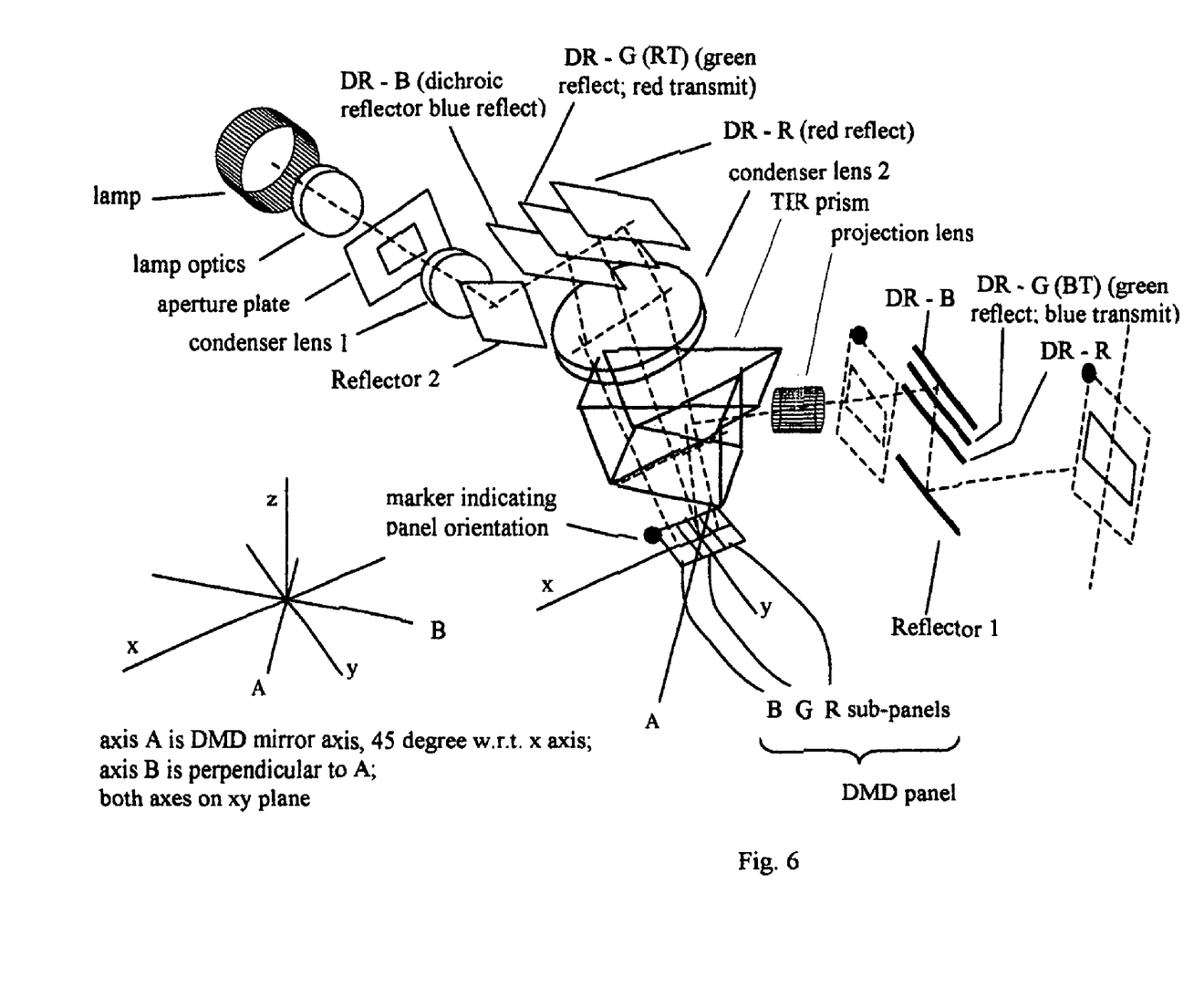
FIG. 6 illustrates an example projector setup using a DMD system as image source.

FIG. 6 illustrates an example optical setup of a color projector with a single SLM having three sub-panels of different primary colors. The setup uses the DMD system. Generally, this is based on the example setup described in FIG. 10a-c of Tsao U.S. patent application Ser. No. 09/882,826. Specifically, the DMD panel has the rotating axis of its micro-mirrors aligned 45 degrees with respect to the edges of the rectangular SLM frame. Accordingly, the TIR (total internal reflection) prism must be oriented 45 degree with respect to the edges of the DMD panel as well, to get best contrast in the projected image. The illumination optics, on the other hand, generally aligns to the orientation of the DMD so that the three separate images of the aperture can be stepped (projected) onto the three sub-panel locations on the DMD panel. The incidence angle of the primary illumination beam requires slight deviations in order to obtain optimum illumination efficiency. In the lamp system, the lamp optics applies a set of cylindrical lens so that the lamp beam can be formed to a shape that covers the aperture with most efficiency.

Figure 8:
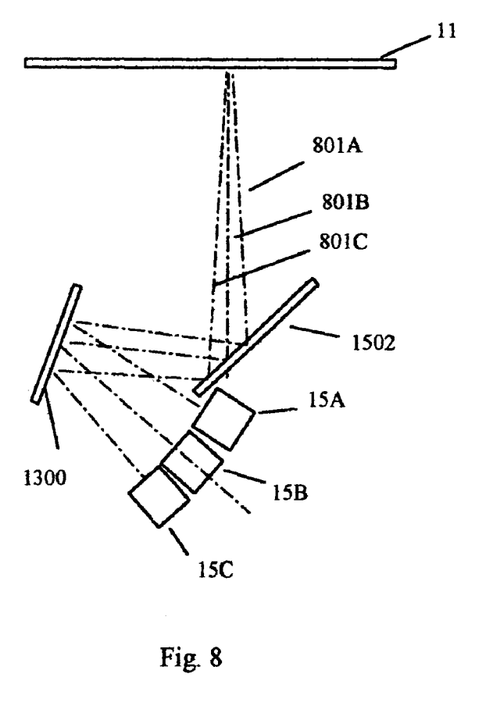
FIG. 8 illustrates three-projector alignment in one example setup of his invention.

As shown in FIG. 8, three projectors of the type of FIGS. 6, 15A, 15B and 15C, can be aligned with their projection beams (801A, 801B, and 801C) intersecting at a fixed distance and thereby superimposing the projected sub-frames. Such a layout can be used in a volumetric 3D display based on Moving Screen Projection by making the intersecting point on the moving screen 11. In the case of a rotating screen system, for example, FIG. 1 of Tsao et al. U.S. Pat. No. 5,754,147, the projection path length is always constant. In the case of a reciprocating screen system, for example, FIG. 4b of Tsao, U.S. Pat. No. 6,302,542 B1, the projection path length is kept constant by the reciprocating reflector 1300. As a result, the projected sub-frames from the three projectors will always superimpose on the moving screen.

Figures 9A, 9B, 9C, 10:
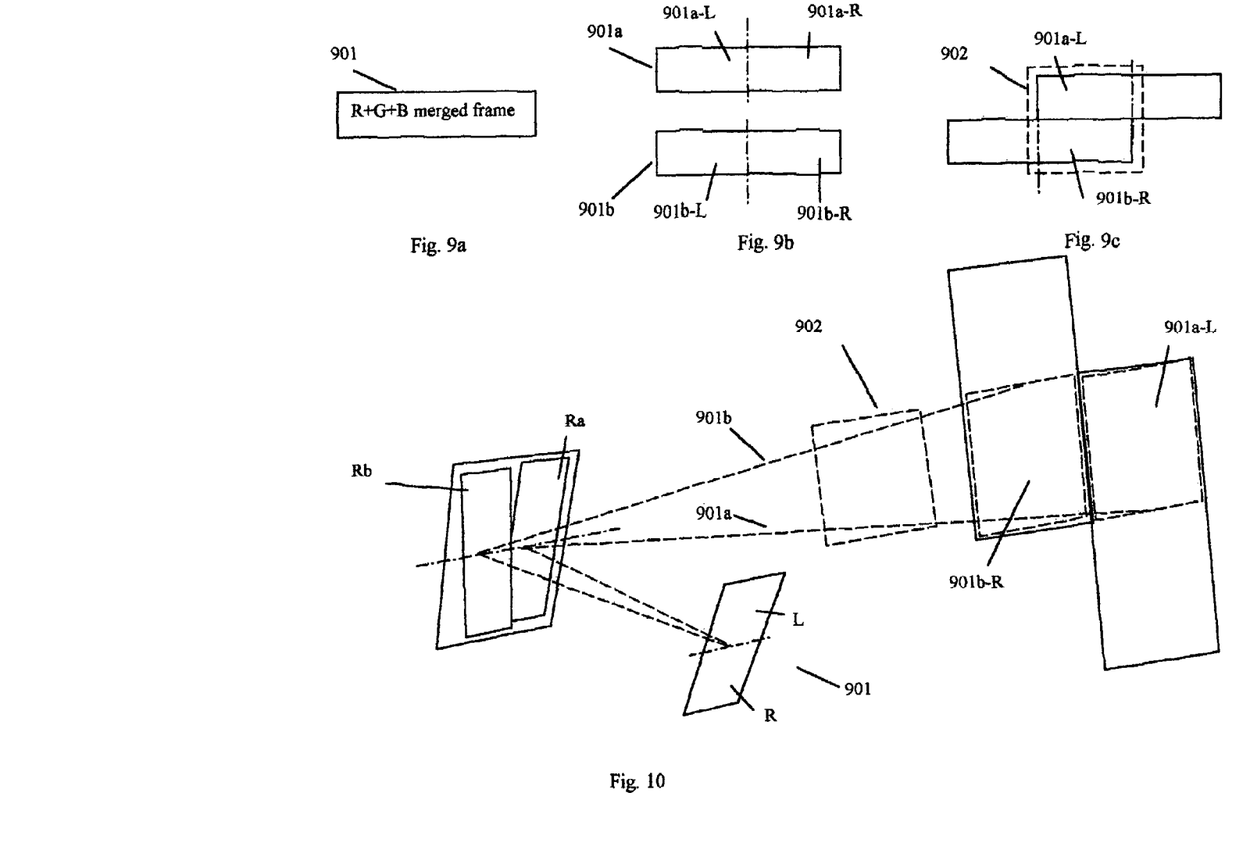
FIG. 9a-c illustrates method of adjusting picture aspect ratio in this invention.
FIG. 10 illustrates an example optical layout for aspect ratio adjustment.

One practical issue of using the Discovery 1100 system is that data must be written into the DMD row by row, so that sub-panels have to be defined with their long-side along the long side of the full panel, as shown in FIG. 1a. As a result, the merged or superimposed sub-frame can have a very high aspect ratio, as shown in FIG. 9a. This can be non-desirable.

The solution is to cut the merged sub-frame into two halves and then stitch them side by side to change the aspect ratio. The content of the sub-panels should of course be programmed to reflect this geometric definition accordingly. This can be done by first split the image of a merged sub-frame into two images 901a and 901b, as shown in FIG. 9b. The two images can then be re-aligned side by side to form the new stitched frame (901a-L plus 901b-R, for example), as shown in FIG. 9c. An aperture stop 902 is used to block out the un-wanted halves of the sub-frames. In general, a beam splitter can be used to split the image beam and reflectors can be used to re-align the two image beams. An alternative simple approach is using a dual-reflector set with two reflectors placed side by side but with a slight difference in angular positions. As illustrated in FIG. 10, the projection beam of the merged sub-frame covers both reflector Ra and Rb. The two reflectors create two reflection beams toward different directions. At a fixed distance, the two images can be re-aligned and the two halves of the sub-frame can be stitched side by side.

The dual-reflector set can be used as the reciprocating reflector 1300 directly in a volumetric 3D displays based on a reciprocating screen, keeping the whole system simple. It can also be placed into the projection path of a volumetric 3D displays based on a rotating screen, with or without an image rotator as the image delivery system.

The foregoing discussion should be understood as illustrative and should not be considered to be limiting in any sense.

For example, the implementation examples of this invention described up to now define each sub-panel as an isolated and separate area on the SLM. This is because data writing to the example SLM used, Discovery 1100, has to be done by successive rows. However, if a SLM allows random row writing or even random word writing, then sub-panels can be defined as other forms. For example, if data can be written to any row randomly, then a sub-panel structure in the form of FIG. 3e of Tsao U.S. patent application Ser. No. 09/882,826 can be used. If data can be written to any word in any row randomly, then a sub-panel structure similar to FIG. 3g of Tsao U.S. patent application Ser. No. 09/882,826 can be used.

For another example, this invention has been described using V3D displays with a moving screen and an image delivery mechanism. However, a V3D display system without an image delivery mechanism can still apply this invention, as long as it uses a projector with a SLM as image source. Examples V3D display systems include the systems describe in R. K. Dorval et. al. U.S. Pat. No. 6,554,430 and in Thompson et al. U.S. Pat. No. 5,506,597, which are incorporated herein by reference.

For another example, this invention has been described using V3D displays with a moving screen. However, this invention is not limited to moving screen systems. It applies as long as the V3D display system uses a projector with a SLM as image source. Example V3D display systems include systems based on two-stage excitation principle, such as the systems of FIG. 21 and FIG. 22 of Tsao, U.S. Pat. No. 6,765, 566 B1; and systems based on stacked switchable screens, such as the system described in Sullivan U.S. Pat. No. 6,100, 862, which is incorporated herein by reference.

While this invention has been particularly shown and described with reference to certain embodiments thereof, it will be understood that these embodiments are shown by way of example only. Those skilled in the art will appreciate that various changes in form and details may be made therein without departing from the spirit and scope of the invention as defined by the following claims and their equivalents.

The invention claimed is:

1. Method of displaying a volumetric 3D image in actual space by using a volumetric 3D display based on a projector system, said projector system comprising a spatial light modulator as image source, the method including steps of:
    (1) providing a set of frames of image data to be projected by the projector system to form the volumetric 3D image;
    (2) dividing the pixels of the spatial light modulator into a number of groups and defining each group as a sub-panel;
    (3) projecting the images of the sub-panels and recombining and superimposing them into one picture frame;
the method further including improvements for the display and the projection of sub-frames at an effective frame rate that can be higher than the full frame rate of said spatial light modulator, said improvements requiring neither the need of modulation of the light source of projection nor the need of switchable color filters, said sub-frame being defined as one frame of image data being displayed on one said sub-panel, herein said display of sub-frames meaning only the display of image on said sub-panel as a result of data writing to said spatial light modulator, said improvements including steps of:
    (4) applying a data writing method in order to display said frames of image data at an effective frame rate that can be higher than the full frame rate of said spatial light modulator, the data writing method writing data to said sub-panels by turns so that the written data can be displayed on said sub-panels in a fashion such that at any time only one sub-panel displays one frame of said frames of image data and the rest of the sub-panels display blank or black, the step of writing data to sub-panels by turns including writing said frames of image data in sequence to each of the sub-panels in a fixed order and erasing the written data on a sub-panel that has been displayed before the next sub-panel displays data, herein said display of sub-frames meaning only the display of image on said sub-panel as a result of data writing to said spatial light modulator;
    (5) projecting said sub-frames in their displayed sequence and showing each projected sub-frame at a different and pre-determined location in actual space to form the volumetric 3D image.

2. Method of claim 1, said spatial light modulator comprising a memory buffer, said memory buffer retaining image data written to the spatial light modulator, a separate command initiating the display of the stored image data on the spatial light modulator, the step of applying a data writing method including a step of writing data to said memory buffer of each of the sub-panels.

3. Method of claim 2, wherein
    said spatial light modulator including the following features:

(A) data writing starting only at either the top row or at the bottom row of the spatial light modulator, data writing being one row at a time, (B) data writing being able to pause with current row location staying unchanged and being able to resume from the last row location before pausing;

the step of defining sub-panels defining three sub-panels with the first sub-panel at the top, the second sub-panel in the middle and the third sub-panel at the bottom;

said data writing method including steps of:
  (a) erasing all data on the spatial light modulator;
  (b) writing data to the memory buffer of the first sub-panel then pausing the writing;
  (c) displaying data on the first sub-panel;
  (d) resuming writing data to the memory buffer of the second sub-panel then pausing the writing and then erasing data displayed on the first sub-panel;
  (e) displaying data on the second sub-panel;
  (f) writing data to the memory buffer of the third sub-panel then pausing the writing, and then erasing data displayed on the second sub-panel;
  (g) displaying data on the third sub-panel;
  (h) repeating from step (a).

4. Method of claim 1, said projector system further including at least one additional spatial light modulator as image source, the method further including steps of:
  (1) providing at least one additional set of frames of image data;
  (2) dividing the pixels of said additional spatial light modulator into a number of groups and defining each group as a sub-panel;
  (3) projecting the images of the sub-panels of all spatial light modulators of the projector system and recombining and superimposing them into one picture frame;
  (4) applying said data writing method to write said additional set of frames of image data to sub-panels of said additional spatial light modulator to display data one sub-panel at a time while keeping the rest of the sub-panels blank or black, defining frames of image data displayed on the sub-panels as an additional set of sub-frames;
  (5) projecting the additional set of sub-frames, the sub-frames of the additional set and of the original set forming a set of superimposed sub-frames, each superimposed sub-frame including sub-frames coming from different spatial light modulators.

5. Method of claim 4, said projector system including 3 spatial light modulators as image source, each spatial light modulator having a R sub-panel, a G sub-panel and a B sub-panel; said R sub-panel being illuminated by a red light, said G sub-panel being illuminated by a green light, said B sub-panel being illuminated by a blue light; said R sub-panel displaying R sub-frames, said G sub-panel displaying G sub-frames, and said B sub-panel displaying B sub-frames, each said superimposed sub-frame including a R sub-frame, a G sub-frame and a B sub-frame.

6. Method of claim 4, said projector system including 3 spatial light modulators as the image source, each spatial light modulator being illuminated by light of a different primary color.

7. Method of claim 1, further including:
  (i) a step of optically splitting a sub-frame into two sub-frame images;
  (ii) a step of optically stitching one half of one said sub-frame image together with one half of the other said sub-frame image in order to adjust aspect ratio.

\* \* \* \* \*